Dec. 17, 1940.    O. J. APPEL    2,224,946
HEATING SYSTEM
Filed Jan. 29, 1938    3 Sheets-Sheet 1

INVENTOR
Oscar J. Appel,
ATTORNEYS.

Dec. 17, 1940.   O. J. APPEL   2,224,946
HEATING SYSTEM
Filed Jan. 29, 1938   3 Sheets-Sheet 2

INVENTOR
Oscar J. Appel
BY Fraser, Myers & Manley
ATTORNEY

Dec. 17, 1940.　　　O. J. APPEL　　　2,224,946
HEATING SYSTEM
Filed Jan. 29, 1938　　　3 Sheets-Sheet 3

INVENTOR
Oscar J. Appel,
BY
Fraser, Myers & Manley
ATTORNEYS.

Patented Dec. 17, 1940

2,224,946

UNITED STATES PATENT OFFICE 2,224,946

HEATING SYSTEM

Oscar J. Appel, Paterson, N. J.

Application January 29, 1938, Serial No. 187,610

6 Claims. (Cl. 236—9)

This invention relates to improvements in automatically fired heating systems of the type commonly employed in private homes and relatively small commercial establishments. While it is particularly concerned with systems utilizing indirect fan blast radiation, those wherein air is heated in one part of the building and circulated through appropriate conduits to and from the occupied spaces thereof, some of its modifications are fully applicable to systems in which heat is radiated directly within the occupied spaces, or wherein it is supplied to the enclosures both directly and indirectly.

The automatic firing equipment which for various reasons has had greatest success in this class of installations, functions intermittently, in response to temperature changes within the occupied part of the building as indicated by a thermostat located within the heated space. It is an "on" or "off" system, and modulation is effected only by supplying heat at full blast or not at all. At best, it merely functions to heat the building to an average temperature, and it does this only by overheating and then overcooling. During the cooling part of the cycle, of course, the air within the occupied space tends to stratify—the warmer air rising toward the ceiling, and the cooler, settling to the floor. Under such circumstances there may be a temperature difference of two or more degrees between the air temperature at the floor level of the room, and that at shoulder height, and this condition may persist for some little time before the thermostat is again affected.

That type of firing control produces an unsatisfactorily great temperature variation when it is used with radiation located directly within the occupied zones; and it becomes even worse when used with indirect fan blast radiation. The latter, for efficiency and economy, should employ extended surface radiation having a very high heat transfer capacity and a correspondingly low heat storage capacity. With it, heat transfer stops almost simultaneously with the stopping of the fuel burner. If air circulation is continued, the occupied spaces become much over-cooled; if not, then stratification with a wide temperature variation at different levels follows almost immediately.

The principal object of the present invention is to smooth out, or level off, the temperature fluctuation within the heated parts of a building employing automatic, intermittently-operated firing equipment; to confine the temperature range within limits which are so close to the desired average that necessary variations from that average are substantially inappreciable to occupants of the building.

It is another object of the invention to provide a system wherein air may be circulated within the occupied spaces almost continually for the purpose of preventing stratification, and wherein the temperature of the air supplied may be modulated in accordance with the demands for heat within the occupied spaces.

It is another object of the invention to provide a system utilizing intermittently-operated fuel burning equipment, and extended surface fan blast radiation if that is desired, with means whereby air may first be supplied to the rooms at a fairly high temperature in order to satisfy the demands of a main thermostat in the room, and may thereafter be supplied at a somewhat lower temperature which is insufficient to affect that main thermostat but is adequate partially to offset heat losses from the room as they occur.

The full nature of the invention, along with other objects and various features thereof, will be more fully understood from a consideration of the following description in the light of the accompanying drawings, wherein.

Figures 1, 2:
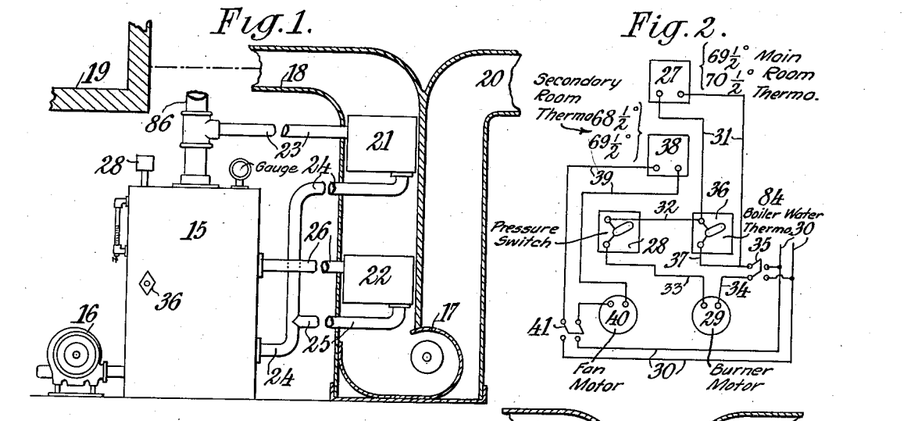
Figure 1 is a diagrammatic view, partly in section, illustrating the application of the principles of the present invention to an intermittently fired, combination steam-hot water, heating system.
Fig. 2 is a diagram of a control apparatus adapted to be used with the system of Fig. 1.

In one preferred modification of the invention, as illustrated in Fig. 1, the heating system comprises a boiler 15 having the usual accessories; automatic firing equipment 16, which is here illustrated as an oil burner, although a mechanical coal stoker or gas burner might just as readily be used; heat interchanging means; and a fan 17 adapted to circulate air over the interchanger through supply conduit 18 to a room, of which a fragment is indicated at 19, and from the room through return conduit 20 to the fan.

In this modification the heat interchanger is divided into two parts, 21 and 22. Although diagrammatically represented in the drawings, each of these interchangers is of the well known extended surface variety, comprising a series of copper tubes having fins formed thereon, and joined at their opposite ends to appropriate supply and discharge headers. The advantages of such extended surface radiation by way of large heat transfer capacity, correspondingly small heat storage capacity, light weight, etc., are too well understood to need consideration here. The main interchanger 21 is located in the main supply duct 18 at a point above the water level in the boiler, and it is adapted to receive steam from the latter through pipe 23, and to return condensate thereto, through pipe 24. The secondary interchanger, 22, is also located in the main air conduit 18 but at a point wholly below the normal water level in the boiler, and it is connected to the latter through water circulating lines 24, 25 and 26, which are also wholly below the water level.

In operation, when heat is supplied to the boiler for a sufficient length of time to generate steam, then that steam will be circulated through the main interchanger 21, and condensate returned therefrom, at a fairly high temperature which may range from 212° F. to approximately 230° F., depending on the pressure which is carried in the system. At the same time, of course, the secondary or tempering interchanger 22 is supplied with hot water within substantially the temperature range above specified.

The fan 17 functions to circulate air through the system, and that air will be heated, in part by its contact with the tempering interchanger 22, and in part by the condensation of steam in the main interchanger 21. In any event it will be supplied to the room at a fairly high temperature, and accordingly will quickly bring the temperature of that room to a desired point. When that happens, and as will hereinafter be more fully described, the burner 16 will be cut off; and further supply of steam to the interchanger 21 will cease. The water within the boiler, however, is still at a fairly high temperature, and represents a source of heat which may be drawn upon for tempering purposes. Assuming for the moment, though it is not necessarily true, that the fan 17 is still functioning to circulate air, then that air will pick up heat from the secondary interchanger 22, cool the water therein, and thus maintain a thermo-syphon circulation of the water from the boiler through that interchanger.

It is evident that the interchanger 21, having very low heat storage capacity in and of itself, cools very rapidly when the supply of steam thereto ceases. The secondary interchanger 22, however, although it too has low inherent storage capacity, can draw upon the storage capacity of the water in the boiler. With this system then, and in spite of the fact that its intermittently fired and uses extended surface radiation, there is a carry-over capacity which tends to temper the air in circulation for some considerable time after the burning equipment has been stopped.

A control arrangement for use with the apparatus of Fig. 1 is illustrated in Fig. 2. Preferably that arrangement is divided, functionally, into two parts,—one adapted to govern the operation of the burner; and the other to regulate the air circulation. The first part comprises a main room thermostat 27 of any ordinary type, located on a wall of one of the occupied rooms at a point about shoulder high, and connected, in electrical series, with a pressure switch 28, the motor 29 of the burner 16, and a source of electricity indicated by the main line 30 through branch lines 31, 32, 33, 34, and a switch 35. This thermostat is adapted to operate within a very small temperature range, cutting "on," for example, at 69½°, and cutting "off" at 70½°. The pressure switch 28, as is usual, operates within a pressure range of from one-half to two and one-half pounds per square inch, cutting "on" when the pressure drops below the first-mentioned limit, and cutting "off" when it rises above the last-stated one. It functions solely as a safety device to limit the possible pressure which may be built up in the system. When the main room thermostat is "on", indicating a demand for heat within the occupied part of the building, the pressure switch will likewise be "on" for there is then no pressure in the boiler. The closing of this main thermostat accordingly completes the circuit to start the burner motor, and that, in turn, functions to fire the boiler and generate steam. That condition will persist until the main thermostat is satisfied, or, the pressure in the boiler rises above two and one-half pounds.

In conjunction with the foregoing part of the burner control there is another thermostat, 36, which is shunted across the main room thermostat 27, but in series with the pressure switch 28, the burner motor 29, and the main line 30 through branch lines 32, 33, 34 and 37. This thermostat, responding to temperature changes of the water within the boiler, is set to "close" the circuit, including the burner motor 29, whenever the water temperature drops below 160°, and to hold that circuit closed until that temperature rises above 180°. The temperature range specified is purely illustrative, for the thermostat 36 may be set to operate between any desired limits.

The second part of the arrangement of Fig. 2 controls the operation of the fan 17. In its preferred embodiment it comprises a secondary room thermostat 38 which is in series electrically through lines 39 with the motor 40 of the fan 17, a hand switch 41, and the source of electricity which is again indicated by the main line 30. This thermostat is located within one of the rooms to be heated, preferably at or very near the floor level therein. It may, and usually will be, mounted beneath the main thermostat, but at a point four or five feet therebelow.

In view of the tendency of air in the room to stratify when not in circulation, the secondary thermostat is set to operate within limits which differ from those of the main one. For purposes of description it will be assumed that it "closes" the fan motor circuit when the temperature at the floor level of the room drops to 68½°, and "opens" that circuit as that temperature rises above 69½°. The assumption is this: When the air in the room is not circulating, and hence is stratifying, the temperature at the floor level may drop below 68½° even though the temperature of the air surrounding the main thermostat is still in excess of its lowest limit, 69½°. If the fan is placed in operation at that time, its discharge into the room will stir up and circulate the overheated air adjacent the ceiling, and this, in conjunction with the heat supplied by the tempering interchanger, should bring the entire room to a temperature which is still above 69½°.

The entire operation and control of the system of Figs. 1 and 2 will now be described. Assuming that the main room thermostat is calling for heat, then the burner will be started, and will be kept running for a sufficient length of time to generate steam in the boiler. Under this condition the secondary thermostat must likewise be "on." Accordingly, air passing over the interchangers 21 and 22 will pick up and discharge heat within the room at a fairly high temperature. In a short time the temperature of the room will be raised to the desired point, and the main thermostat will then "cut-off."

Under ordinary conditions, the secondary thermostat will likewise be satisfied at this time, and the circulation of air through the room will be halted. Promptly stratification will set in, and in due course the secondary room thermostat will again be affected, even though the main one is still satisfied, to restart the circulation of air. That air, under such conditions, picks up heat from the tempering interchanger 22, but not from the primary one, 21, and discharges it within the room. That additional heat, plus the fact that the warm air which has stratified at the ceiling is again placed in circulation, should be sufficient to satisfy the demands of the secondary room thermostat, thus again halting the operation of the fan. The fan circuit may cycle in this fashion several times without affecting the main thermostat. If, however, the heat supplied by the tempering exchanger, which is always maintained at a temperature in excess of 160° by the operation of the thermostat 36, and the destruction of stratification in the room, still fails to satisfy the secondary thermostat, then the fan will continue in operation and, very shortly, the main room thermostat will again come "on" to start the burner, generate steam, and supply air to the room at a much higher temperature.

Figures 3, 8:
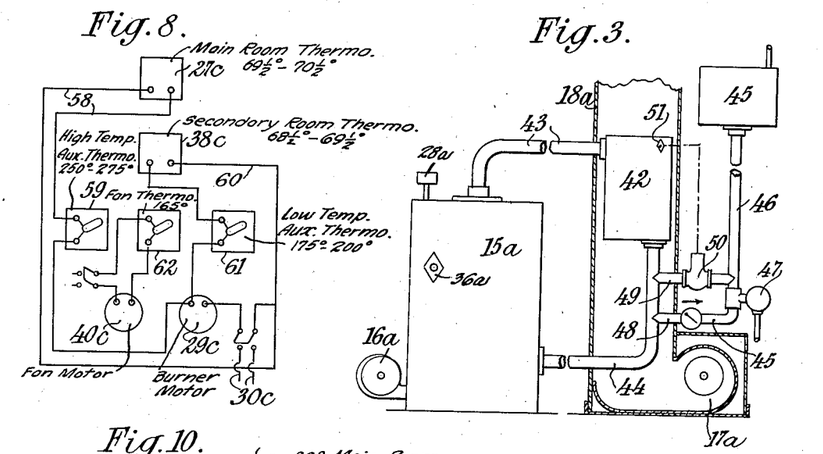
Fig. 3 is a view similar to that of Fig. 1, illustrating a modified form of steam-hot water heating system according to the invention.
Fig. 8 represents an arrangement of control instruments which may be used in connection with the system of Fig. 7.

This combination steam-hot water system is shown in another form in Fig. 3. There the boiler 15a, the firing equipment 16a, the fan 17a, and the supply and return conduits, are substantially identical with those shown in Fig. 1. The interchanger 42, however, is a single unit, again preferably of the extended surface type. It is connected to the boiler through pipes 43 and 44, and to a conventional expansion tank 45 through branch pipe 46. An automatic water feeder 47 may be included in this branch pipe, if that is desired.

Figures 4, 9, 10:
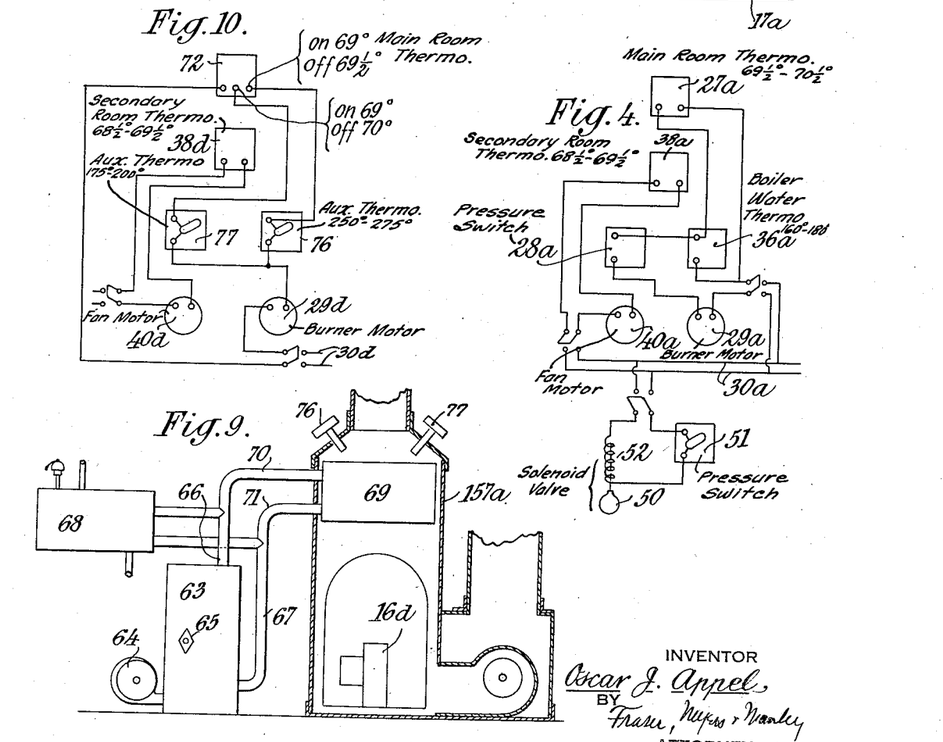
Fig. 4 illustrates diagrammatically a control arrangement applicable to the system of Fig. 3.
Fig. 9 is another view similar to that of Fig. 1, illustrating the adaptation of the principles of the invention to a combined hot water-hot air heating system.
Fig. 10 is a diagram of a control arrangement applicable to use with the system of Fig. 9.

The operation of this system, and of other structural details not yet mentioned, may best be understood by a consideration of Fig. 3 in the light of the control diagram of Fig. 4. The latter diagram is similar to that of Fig. 2, and the control instruments therein may be assumed to operate within the limits defined for the like parts of Fig. 2. Assuming that the main thermostat 27a is "on," the firing equipment will be started, just as in the previous case, to generate steam in the boiler. At this time the boiler and the interchanger will be fully flooded. The addition of heat to the system first causes an expansion of the water, which is relieved through pipe 46 and the expansion tank. Upon the continued heating, and the consequent generation of steam, that steam displaces further water through the line 46 into the tank, the column of water in the line and the tank just balancing the pressure built up in the boiler. Within a short time the exchanger will have been cleared of water, and thereafter it functions to condense steam to supply heat to the room at fairly high temperature.

In order to prevent the return of the water to the system at this time, with a consequent tendency to "hammer," a check valve 48 is included in the line 45, and whereas it permits a flow of water to the tank, as indicated by the arrow, it precludes a return of water therefrom. Under such conditions the system can operate very satisfactorily to generate and condense, steam, and thus supply air to the occupied rooms at the desired high temperature.

With the system operating in this manner, the demands of the thermostat 27a will soon be satisfied, and the burner will go "off." At this time it is desirable to convert the system from a steam-condensing, to a hot water one, and for this purpose it is necessary to return the water which was displaced into the tank 45, and again flood the boiler. This may readily be accomplished by inserting a by-pass line 49 across the check valve from return pipe 44 to expansion pipe 46; and by including in this line a solenoid valve 50. The latter is normally open, and is intended to be closed only when the pressure in the interchanger 42 rises above a definite limit, which may be taken as one-half pound per square inch. Such operation is effected by pressure switch 51 which responds to pressure changes within the exchanger. In the drawings the valve 50 is of the direct acting type, i. e., it is normally closed, and is opened only in response to the energization of a solenoid. In such case the pressure switch 51 is set to close the circuit, including the solenoid 52 of the valve 50, and open that valve, when the pressure in the exchanger drops below one-half pound per square inch; and to open that circuit, thus permitting the closing of the valve, when the pressure therein rises above the defined limit. A reverse acting valve 50 may be used, if desired, and the pressure switch 51 would then be set to close the circuit, and the valve, when the pressure exceeded one-half pound per square inch.

With this arrangement, when the demands of the main room thermostat have been satisfied and the pressure in the exchanger begins to drop, the valve 50 will be opened to permit the return of water from the expansion tank to the boiler through the by-pass line 49, thus flooding the entire system. Thereafter, and until the main thermostat again calls for heat, the operation of the burner will be under the control of the water thermostat 36a, that thermostat acting as hereinbefore described, to maintain the water temperature in the boiler between 160° and 180°. Th exchanger 42 will then act solely for tempering purposes, in cooperation with the secondary room thermostat 38a and the fan 17a, in the manner described in connection with Fig. 2.

Figure 11:
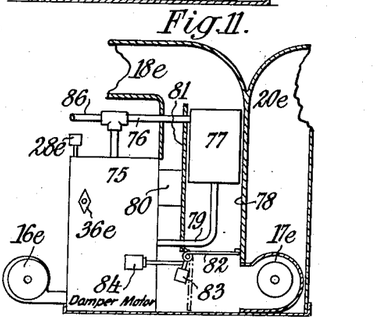
Fig. 11 is a diagrammatic view, partially in section, illustrating another modified form of steam-hot water heating system embodying the invention.

Another modification of the invention utilizing combined steam-hot water radiation is shown in Fig. 11. There the boiler 75 is arranged to supply steam through pipe 76 to an exchanger 77 located in conduit 78, and to receive condensate therefrom through pipe 79 in response to the application of heat by the automatic firing equipment 16e. The boiler is of somewhat unique design in that it has a plurality of fins 80 formed on its rear side and extending completely across the branch air conduit 81. The two conduits 78 and 81 are parallelly disposed to receive air from return conduit 20e and fan 17e, and to discharge the air into the main supply pipe 18e. A damper 82 is normally held by counterweight 83 in such a position as to close the conduit 78. In such case the entire volume of air supplied by fan 17e passes over the fins 80 through conduit 81 and into the supply conduit 18e. The damper is further provided with a motor 84, linked to the arm on which the counterweight 83 is mounted, and adapted when actuated, to move the damper from the full line position of Fig. 11 to the dotted line position thereof, thus closing conduit 81 and directing all of the air through conduit 78 and over the exchanger 77.

Figure 12:
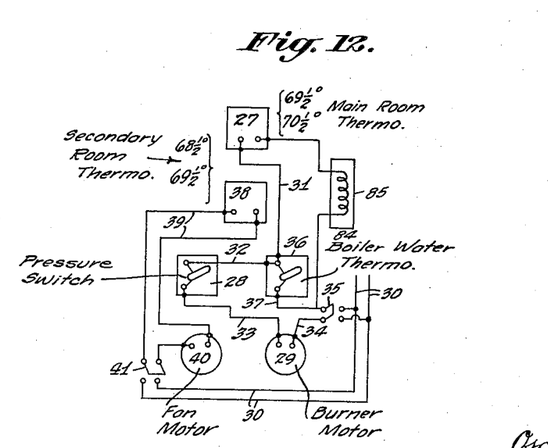
Fig. 12 is a diagram of a control arrangement which may be employed for operating the system of Fig. 11.

The operation of this system is substantially identical with that of Fig. 1; and the control arrangement of Fig. 2 may be used when modified by the inclusion for the solenoid 85 of the damper motor 84 in an electric circuit governed by room thermostat 27 as illustrated in Fig. 12. In that modified arrangement the main room thermostat 27 serves, when "on," to complete an electric circuit to start the burner motor 29, and simultaneously to energize the solenoid 85 for the purpose of moving the damper 82 from its full to its dotted line (Fig. 11). Under such circumstances the entire volume of air supplied by fan 17e will pass through conduit 78, pick up heat at high temperature from the exchanger 77, which is now being supplied with steam, and discharge that heat into the enclosure. When the demands of the main room thermostat have been satisfied, then the burner is halted, the solenoid 85 is de-energized, and the damper 82 returns to its full line position of Fig. 11 under the influence of the counterweight. Any air thereafter circulated by fan 17e, under the control of the secondary room thermostat 38, passes only over the fins 80 on the boiler, and in this way picks up heat and supplies it to the enclosure at a fairly moderate temperature. In other respects the operation of the system of Fig. 11 is identical with that shown and hereinbefore described in connection with Figs. 1 and 2.

Figure 5:
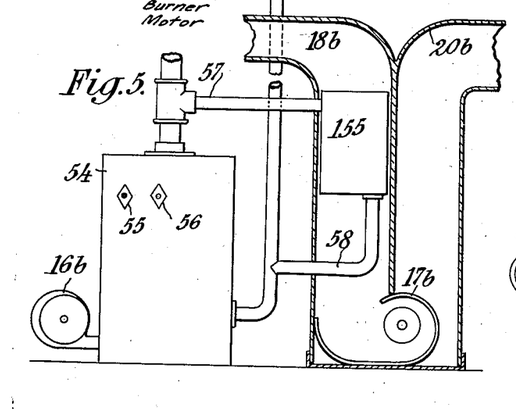
Fig. 5 shows, in diagrammatic form, and partly in section, the application of the invention to a hot water heating system.

The system shown in Fig. 5 is of the straight hot water type comprising a boiler 54 having the usual accessories, firing equipment 16b similar in all respects to the fuel burner 16 of Fig. 1, a fan 17b for circulating air to and from the occupied parts of the building through conduits 18b and 20b. A single interchanger 155, again of the extended surface type by preference, is located in the conduit 18b adjacent the boiler, and is connected thereto through pipes 57 and 58. The latter has a branch leading to a conventional expansion tank 45b.

Figure 6:
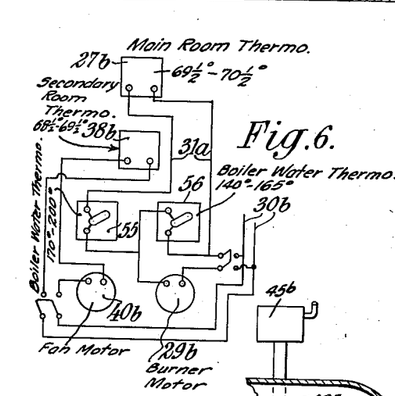
Fig. 6 is a diagram of a control arrangement applicable to the system of Fig. 5.

The operation of this system in accordance with the present invention can best be understood by a consideration of the apparatus of Fig. 5, along with the control arrangement of Fig. 6. The latter is quite similar, both in principle and operation, to the control diagram of Fig. 2. It again is divided into two parts, of which the first is intended to control the operation of the burner, and the second to regulate the functioning of the fan.

The first part comprises a thermostat 27b mounted on a wall of one of the rooms to be heated, at about shoulder height, and again set to operate between the limits of 69½° and 70½°. In this arrangement a thermostat 55 replaces the pressure switch 28 of Fig. 2. It responds to temperature changes of the boiler water within a prescribed range, being set, for example to come "on" when the temperature of the water drops below 170°, and to go "off" when that temperature exceeds 200°; and its functions are identical with those of the pressure switch 28, namely, to permit high temperature heating under the control of the main thermostat while simultaneously acting as a safety device to prevent dangerous overheating.

The main thermostat 27b (Fig. 6) and the high temperature thermostat 55, are in series with the burner motor 29b and the main line 30b. In conjunction with this part of the burner control there is a low temperature water thermostat 56 shunted across the main thermostat 27b and the safety thermostat 55; and in series with the burner and the source of current. This low temperature water thermostat corresponds in function to the thermostat 36 of Fig. 2. It is, however, preferably set to operate within somewhat lower temperature limits. For purposes of description it may be assumed to come "on," and close the circuit including the burner motor 29b, when the temperature in the boiler drops below 140°, and to go "off," thus opening that circuit, when that temperature rises above 165°.

The second part of the control arrangement of this figure may be identical with that of Fig. 2, comprising a secondary room thermostat 38b located below the main one at the floor level, and being electrically in series with the fan motor 40b and the source of current 30b. Its limits of operation may again be those assumed in connection with the thermostat 38 of Fig. 2, namely 68½° to 69½°.

The operation of this system is identical with that described in connection with Figs. 1 to 4, inclusive. Briefly stated, when the temperature of the air surrounding the main room thermostat drops below 69½°, the burner will be placed in operation, and will continue so until the demands of the main room thermostat or of the high temperature thermostat 55 have been satisfied. During that period the fan 17 discharges air over interchanger 155, which is now being heated to a temperature of between 170° and 200°, and discharges that high temperature air into the room. Under such conditions the room will rapidly be brought to a desired temperature, whereupon the demands of the main thermostat will be satisfied and the operation in the boiler will be discontinued. Likewise, under these conditions the demands of the secondary room thermostat will also be satisfied, and the latter will function to stop the circulation of air. Stratification of air within the room will again set in, and in due course affect the secondary thermostat, and the latter will restart the fan. Air now passing over the interchanger will pick up heat at a lower temperature since the latter is maintained, by thermostat 56, between 140° and 165°; and this heat, plus the destruction of the stratification in the room, should be sufficient to satisfy the demands of the secondary room thermostat. If it is not, then in due course the main thermostat will again be affected to raise the temperature of the interchanger and thus supply more heat to the room.

In all of the systems hereinbefore considered, only that part relating to the supply of heat by indirect radiation has been shown or described. Each of these systems may, however, be used as a part of what is termed a "split" arrangement wherein a portion of the heat is supplied indirectly, as shown, and the remainder, directly. In each case then, steam or hot water, as the case may be, may be supplied through a main 86, and returned in the usual way, to and from radiators located in the space to be heated.

Figure 7:
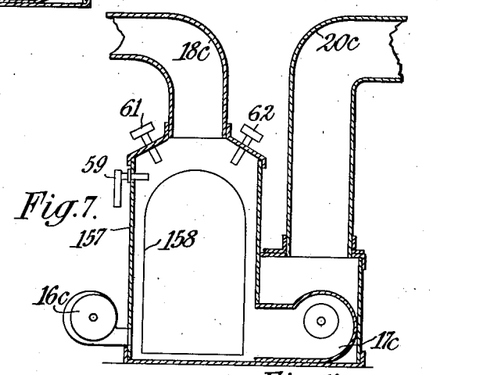
Fig. 7 shows, diagrammatically and in section, the invention as applied to a hot air heating system.

The application of the principles of the invention to straight hot air heating is illustrated in Fig. 7. There the apparatus includes a hot air heater comprising a casing 157 having a fire box 158 therein which serves also as a heat interchanger; an automatic firing mechanism 16c for discharging burning fuel into the fire box; a fan 17c for circulating air through the casing 157 and over the outer surface of the fire box, and to and from the occupied parts of the building, through conduits 18c and 20c, respectively. All of these elements are well known in the art, and they are here shown in purely diagrammatic form.

The operation and control of this system may be achieved in exactly the same way as was that of Fig. 5. In such case it is only necessary to substitute air thermostats, responding to the temperature of air in the dome of the heater, for the water thermostats 55 and 56 of Fig. 6. With this arrangement, the main thermostat would control the operation of the burner through the thermostat 55, set for operation within high temperature limits, to supply air to the room at fairly high temperatures; and the thermostat 56 would operate the burner merely to keep the dome of the heater within desired temperature range. The functioning of the fan under the control of the secondary room thermostat would be identical with that hereinbefore described.

A more economical, and in some respects more satisfactory control of the system of Fig. 7, may be had with the arrangement shown in Fig. 8. There the main room thermostat 27c is in series, electrically, through lines 58 with a first auxiliary thermostat 59 located within the dome of the heater casing 157, the burner motor 29c, and the main line 30c. The first auxiliary thermostat 59 is set to come "on" when the temperature in the dome drops below 250°, and to go "off" when that temperature exceeds 275°.

The secondary room thermostat 38c is in electrical series, through branch lines 60, with a second auxiliary thermostat 61 also located in the dome of the heater, the burner motor 29c, and the source of electric current; and the latter is set to operate between the limits of 175° and 200°.

In this arrangement then, the operation of the burner is under the control of both room thermostats. The operation of the fan 17c is governed by an air thermostat 62 in electrical series with the motor and the source of current represented by the main lines 30c, likewise located in the dome of the heater. It is set to come "on" and start the fan whenever the temperature in the dome rises above 165°, and it goes "off" when that temperature drops below that limit.

The complete operation of the system under the control of the arrangement of Fig. 8 is quite similar to that hereinbefore defined in connection with the other modifications of the invention. Briefly, when the main thermostat 27c calls for heat, the burner is started. As soon as the temperature in the heater rises above 165° the fan starts, and circulates air through the heater and through the occupied spaces at a fairly high temperature. When the demands of the main thermostat have been satisfied, the burner will, as usual, go "off." The fan, however, will continue in operation until the temperature in the dome of the heater drops below 165°. Since the heat capacity of the fire box and of the dome is relatively small, that will occur within a few minutes after the main thermostat stops calling for heat. Thereafter, stratification in the room may bring the secondary thermostat 38c "on," and with it the burner, to maintain a temperature in the dome not exceeding 200°. Promptly the fan will come "on" and circulate air through the heater and through the occupied parts of the building. In the latter case the burner is under the control of the second auxiliary thermostat 61, and the latter may cycle several times to supply heat, but within a low temperature range. If the heat supplied in this fashion, plus the destruction of stratification, is insufficient to satisfy the demands of the secondary room thermostat, then within a very short time the main thermostat 27c will call for heat, and its auxiliary thermostat 59 will then hold the burner in operation for longer periods of time, and thus permit the discharge of air into the occupied spaces at a somewhat higher temperature.

With the modifications of Figs. 1 to 6 and 11, inclusive, the boiler itself, under the control of the low temperature thermostat, may be utilized to maintain a supply of hot water for domestic purposes through any usual form of sidearm heater or the like. With a hot air heater, however, that is not possible, and it is the usual practice to provide an auxiliary water heater 63 (Fig. 9) having its own fuel burner 64 operating under the control of a thermostat 65 responding to temperature changes within the hot water heater. The heater is connected through lines 66 and 67 with the usual storage tank 68.

When auxiliary hot water heating equipment of this character is available, it may be applied to further use in connection with the air heating equipment. In such case it is only necessary to provide an interchanger 69, disposed within the dome of the air heater 57a, and to connect that heater through branches 70 and 71 with the hot water supply and return pipes 66 and 67.

The operation of this system and a control arrangement therefor may best be understood by a joint consideration of Figs. 9 and 10. In the latter, the main thermostat 72 is mounted on a wall of one of the rooms to be heated, again at about shoulder height. This thermostat, unlike the ones hereinbefore considered, but as is entirely well known in the art, has two ranges of operation. In the present case it is intended to close both of its electrical circuits when the temperature affecting it drops to 69°, and to open one when that temperature rises above 69½°, and the other when it rises above 70°, as indicated on the drawings. The first of its circuits, operating between 69° and 69½°, includes an auxiliary air thermostat 76 located in the dome of the heater 157a; the motor 29d of the automatic firing equipment 16d; and the source of current represented by the main line 30d. Its second circuit, operating between the limits of 69° and 70°, includes a second auxiliary thermostat 77 also located in the dome of the heater; the motor 29d; and the source of current. The first of the auxiliary thermostats, 76, is set to close the circuit which it controls when the temperature in the dome is below 250°, and to open that circuit when that temperature rises above 275°; whereas the second auxiliary thermostat, 77, closes its circuit when the temperature is below 175°, and opens when that temperature exceeds 200°.

The operation of the fan motor 40d is controlled by a secondary room thermostat 38d mounted within the space to be heated below the main thermostat, and at the floor level. Its range of operation, because of stratification, is again assumed to be between 68° and 69°, just as was the case in connection with Fig. 2.

The remaining part of the control diagram relates only to the regulation of the water temperature in the water heater 63. That is accomplished by thermostat 65 which, preferably, is set to start the burner 64 when the temperature of water in the boiler drops below 140°, and to stop the operation of that burner when that temperature rises above 160°. Consequently the temperature in the boiler, and in the auxiliary interchanger 69, is always somewhere between 140° and 160°.

The operation of the complete system is as follows: If the main room thermostat 72 is calling for heat, both of its circuits, including both the high temperature and the low temperature auxiliary thermostats 76 and 77, respectively, will be in circuit with burner motor 29d, and will start the burner. At the same time, of course, the secondary room thermostat 38d will be unsatisfied, and accordingly the fan 17d will be circulating air to supply heat to the room. Until the temperature in the room rises above 69½° the burner will be under the control of the high temperature thermostat 76, and the temperature in the dome of the heater will be held within a range of from 250° to 275°. When that first part of the main thermostat control is satisfied, the high temperature auxiliary thermostat 76 will be cut out of the circuit, and the operation of the burner will thereafter continue under the control of the low temperature auxiliary thermostat 77. That condition will persist until the room temperature reaches 70°, when the main thermostat will be satisfied and the operation of the burner ceases. At that time the secondary room thermostat 38d should also be satisfied, and the fan should be inoperative. As soon as stratification occurs, however, the fan will again come "on", and air will be circulated through the system, now picking up heat only from the secondary or tempering interchanger 69. If that heat, plus the destruction of stratification, is sufficient to satisfy the demands of the secondary thermostat, then the fan will again be halted, but if not, the operation will continue until the main thermostat again functions.

Figure 13:
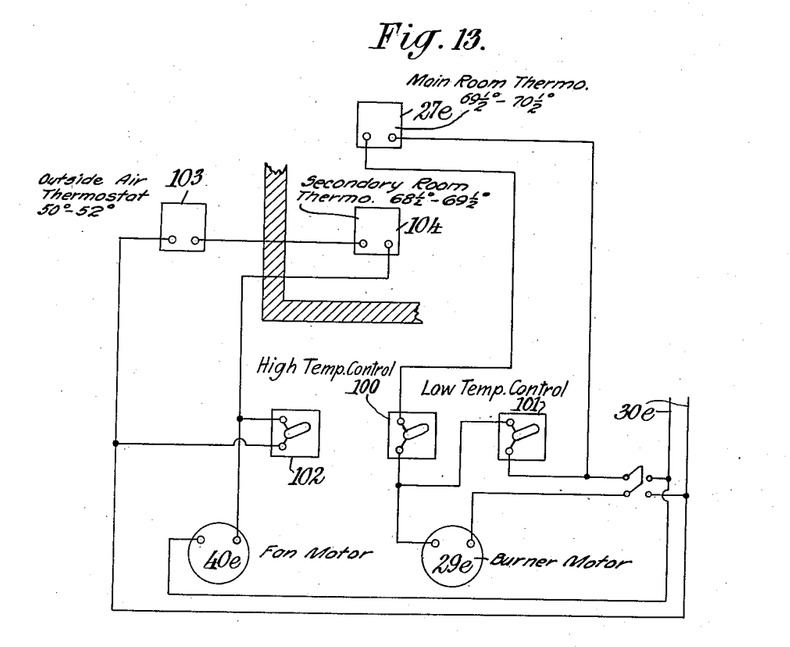
Fig. 13 illustrates a modified form of control arrangement applicable to any of the systems herein shown and described.

The various control arrangements hereinbefore described respond only to temperature changes within the enclosure. In many instances it is desirable to modify such arrangement by placing the system at least partially under the control of temperature changes surrounding the enclosure. In the present application it is contemplated that such modifications can readily be made, and one arrangement therefor is shown in Fig. 13. There, the main room thermostat 27e, in series with a regulating instrument 100 which may be a pressure switch for a steam system or a thermostat for either a hot water or hot air one, controls the operation of the burner motor 29e. This instrument 100 is set to operate within high temperature limits, and is comparable either to the pressure switch 28 of Fig. 2, or to the thermostats 55 and 59 of Figs. 6 and 8, respectively. Accordingly this circuit regulates the supply of heat to the enclosure at high temperature.

In conjunction with the foregoing part of the burner control there is a thermostat 101 shunted across the thermostats 27e and 100, and responding to temperature changes either in the boiler or in the bonnet of the hot air heater. Its function, like that of thermostat 36 of Fig. 2 or thermostat 56 of Fig. 6, etc., is to maintain the temperature of the boiler or the interchanger within a desired low temperature range for tempering purposes, as hereinbefore.

The operation of fan motor 40e in the arrangement of this figure is under the joint control of a regulating instrument 102 responding to temperature changes adjacent the interchanger, and of a thermostat 103 located outside of the enclosure and responding to temperature changes in the outside air.

The regulating instrument 102 may be either a pressure switch which is adapted to close the circuit, including the fan motor 40e, when the pressure in the boiler rises above one-half pound per square inch, or a thermostat responding to temperature changes of the water in the boiler of a hot water system and adapted to close the circuit when the temperature therein rises above 170°, or a thermostat in the bonnet of a hot air heater and adapted to close the motor circuit when the temperature in the bonnet exceeds 250°. Accordingly the fan will be operating whenever the boiler or interchanger temperature is of such value that instrument 102 is closed.

The thermostat 103 is adapted to close the circuit, including the fan motor, whenever the temperature of the outside air drops below a specified point, which may, for purposes of illustration, be assumed as 50°, and open that circuit when the outside temperature rises above 52°. Under such circumstances the fan functions to discharge air over the interchanger which is always maintained at some desired minimum temperature under the control of thermostat 101, and accordingly to supply heated air to the enclosure, but at a low temperature. The amount of heat furnished in this way should not be sufficient to supply all of the requirements of the enclosure, but merely to temper the air and prevent stratification. Under certain conditions, however, and even though the outside temperature is below 50°, this tempering heat would be more than sufficient to care for all of the requirements and would accordingly tend to overheat. To prevent this possibility it is desired, though not entirely necessary, to insert a second room thermostat 104 responding to temperature changes within the enclosure, in series with the thermostat 103. The thermostat 104 is adapted to close its circuit when the temperature in the room drops below the lower limit of the main thermostat 27e, 63°, for example, and to open its circuit when the temperature in the room exceeds the upper limit of the main thermostat, at 71°, for example.

The main thermostat 27e in this arrangement, in conjunction with regulating device 102, is adapted to supply heat to the enclosure whenever it requires it and without regard to the outside air temperature. The outside air thermostat 103, either alone or in conjunction with the safety thermostat 104, is adapted to operate the fan to supply tempering heat to the room whenever the outside temperature drops below a set point.

All of the systems herein described have one factor in common, namely, that the heat supplied to the room may be modulated at two or more temperatures, that air is circulated through the enclosure more or less continually, and that air is never supplied unless some heat is first added thereto. These factors make for a much greater stability of temperature in the enclosure than has heretofore been possible.

The various control arrangements shown, represent only a few of many possible combinations of instruments to effect the stated results. All of them employ two thermostats located within the space to be heated, one at shoulder height or thereabouts, and the other at or very near the floor level. That arrangement is preferred in every case, but it is not entirely necessary, for these various thermostats may be mounted side by side, or unitary ones having two or more ranges may be substituted. In the alternative arrangement both thermostats, or both parts of the unitary thermostat, would be set to come "on" at the same temperature which, for purposes of description, would be 69°; the one of them controlling the supply of heat at high temperature, would be set to go "off" first, at 69½°, for example, whereas the second one controlling the supply of heat at low temperature would be set to open its circuit at the final desired temperature, which is assumed to be 70°.

Further, in the various modifications it has been assumed that the thermostats are of such character as to be capable of carrying the full line voltage for the motors which they control. Frequently it is necessary to use a low voltage control equipment, and to interpose relays in the control circuits adapted to govern the high voltage supply to the various motors. The present arrangements, however, illustrate the requirements of the systems, and it has been considered unnecessary further to lengthen the present description to include modifications, such as the one just mentioned.

Since certain changes may be made in the construction and various modifications applied thereto, it is intended that the foregoing shall be construed in a descriptive rather than a limiting sense.

What I claim is:

1. A heating system for an enclosure including a heat interchanger; a fan for circulating air over the interchanger and through the enclosure; a fuel burner of the on-off type adapted to supply heat intermittently to the interchanger; a first thermostat located in the enclosure at one level and responding to temperature changes within one range; a second thermostat responding to temperature changes at the interchanger, within a prescribed range; said first and second thermostats being in electrical series and being arranged to operate the burner, thus to supply heat to the enclosure at a high temperature differential; a third thermostat located in the enclosure at a level lower than the first and responding to temperature changes within a range lower than that to which the first thermostat responds; a fourth thermostat responding to temperature changes at the interchanger but within a range lower than that to which the second thermostat responds; said third and fourth thermostats being arranged in electrical series and being adapted to operate the burner independently of the first and second ones, thus to supply heat to the enclosure at a low temperature differential; and a fifth thermostat responding to temperature changes at the interchanger and adapted to operate the fan.

2. A heating system according to claim 1 further characterized in that said fifth thermostat is adapted to start the fan only after the operation of the burner has raised the temperature of the interchanger to a desired point.

3. A heating system for an enclosure including heat interchanging means; a fuel burner of the non-modulating type adapted to supply heat intermittently to the interchanging means; a first thermostat located in the enclosure at one level and responding to temperature changes within one range; a second thermostat responding to temperature changes affecting the interchanging means within a prescribed range; said first and second thermostats being arranged in electrical series and being adapted to operate the burner; a third thermostat responding to temperature changes affecting the interchanger but within a range lower than that to which the second thermostat responds, such third thermostat being adapted to operate the burner independently of the first and second ones; a fan for circulating air over the interchanging means and through the enclosures; and a fourth thermostat located in the enclosure at a level lower than the first one and responding to temperature changes within a range lower than that to which the first thermostat responds, said fourth thermostat being adapted to control the operation of the fan.

4. A heating system for an enclosure including a hot-water boiler; a heat interchanger having supply and return connections to the boiler; a fuel burner of the on-off type adapted to supply heat intermittently to the boiler; a fan for circulating air over the interchanger and through the enclosure; a first thermostat located in the enclosure at one level and responding to temperature changes within one range; a second thermostat responding to temperature changes in the boiler within a prescribed range; said first and second thermostats being arranged in electrical series and being adapted to operate the burner thus to supply hot water to the interchanger at a desired relatively high temperature; a third thermostat responding to temperature changes in the boiler but within a range lower than that to which the second thermostat responds, said third thermostat being adapted to operate the burner independently of the other thermostats thus to supply hot water to the interchanger at a desired relatively low temperature; and a fourth thermostat located in the enclosure at a level lower than the first one and responding to temperature changes within a range lower than that to which the first one responds, said fourth thermostat being adapted to operate the fan thus to control the supply of heat to the enclosure.

5. A heating system for an enclosure including heat interchanging means; a fuel burner of the on-off type adapted to supply heat intermittently to the interchanging means; a fan for circulating air over the interchanging means and through the enclosure; a pair of thermostatic switches located in the enclosure at different levels and responding to temperature changes within different prescribed ranges; another pair of thermostatic switches responding to temperature changes at the interchanger within different prescribed ranges; the one of the first mentioned pair of thermostatic switches which responds to the higher range of temperatures in the enclosure being in electrical series with the one of said second mentioned pair which responds to the higher range of temperature changes at the interchanger and being adapted to operate said burner to supply heat to the enclosure at a high temperature differential; another of said thermostatic switches being adapted to operate the burner independently of the series switches just mentioned, to supply heat to the enclosure at a lower temperature differential; and the remaining thermostatic switch being adapted to control the operation of said fan.

6. A heating system for an enclosure, including a heat interchanger; a fan for circulating air over the interchanger and through the enclosure; a fuel burner of the on-off type, adapted to supply heat intermittently to the interchanger; first thermostatic means located in the enclosure and adapted to open and close an electric circuit responsive to temperature changes in the enclosure within a prescribed range; second thermostatic means adapted to open and close an electric circuit responsive to temperature changes at the interchanger within a prescribed range; said first and second mentioned thermostatic means being in electrical series and being arranged to operate said burner to supply heat to the enclosure at a high temperature differential; third thermostatic means located in the enclosure and adapted to open and close an electric circuit responsive to temperature changes in the enclosure within a range lower than that to which the first mentioned thermostatic means respond; fourth thermostatic means adapted to open and close an electric circuit responsive to temperature changes at the interchanger but within a range lower than that to which the second mentioned means respond; said third and fourth mentioned thermostatic means being arranged in electrical series and being adapted to operate said burner independently of the first and second mentioned means to supply heat to the enclosure at a lower temperature differential; and fifth thermostatic means responding to temperature changes at the interchanger and adapted to operate said fan.

OSCAR J. APPEL